United States Patent
Zhao

(10) Patent No.: US 9,244,304 B2
(45) Date of Patent: Jan. 26, 2016

(54) DISPLAY DEVICE AND MANUFACTURING METHOD THEREOF

(71) Applicant: BOE TECHNOLOGY GROUP CO., LTD., Beijing (CN)

(72) Inventor: Weili Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/126,957

(22) PCT Filed: Nov. 9, 2012

(86) PCT No.: PCT/CN2012/084407
§ 371 (c)(1),
(2) Date: Dec. 17, 2013

(87) PCT Pub. No.: WO2013/127192
PCT Pub. Date: Sep. 6, 2013

(65) Prior Publication Data
US 2014/0118669 A1    May 1, 2014

(30) Foreign Application Priority Data
Feb. 27, 2012    (CN) .......................... 2012 1 0047059

(51) Int. Cl.
G02F 1/1335    (2006.01)
G02F 1/1333    (2006.01)
G02F 1/1341    (2006.01)
G02F 1/1343    (2006.01)
G02F 1/139     (2006.01)

(52) U.S. Cl.
CPC ........ *G02F 1/133514* (2013.01); *G02F 1/1341* (2013.01); *G02F 1/1393* (2013.01); *G02F 1/133377* (2013.01); *G02F 1/133516* (2013.01); *G02F 1/133555* (2013.01); *G02F 1/134363* (2013.01)

(58) Field of Classification Search
None
See application file for complete search history.

(56) References Cited

FOREIGN PATENT DOCUMENTS

| CN | 101813842 A | 8/2010 |
|---|---|---|
| CN | 101900913 A | 12/2010 |
| CN | 102012588 A | 4/2011 |
| CN | 102081268 A | 6/2011 |

(Continued)

OTHER PUBLICATIONS

International Search Report mailed Feb. 28, 2013; PCT/CN2012/084407.

(Continued)

*Primary Examiner* — Richard Kim
(74) *Attorney, Agent, or Firm* — Ladas & Parry LLP

(57) ABSTRACT

A display device and a manufacturing method thereof. The display device includes: an array substrate and a color film substrate which are disposed oppositely each other forming a cell, two-dimensionally arranged sub-pixel regions are correspondingly formed in the array substrate and the color film substrate respectively; wall-shaped electrodes, sandwiched between the array substrate and the color film substrate, the wall-shaped electrodes separate each row or line of the sub-pixels region to form a light ray transmission area and a light ray reflection area; and a liquid crystal layer, sandwiched between the array substrate and the color film substrate, and including liquid crystal in transmission area and liquid crystal in reflection area respectively filled in the light ray transmission area and the light ray reflection area, wherein light rays of the light ray transmission area and the light ray reflection area has the same optical path differences.

12 Claims, 2 Drawing Sheets

(56) References Cited

FOREIGN PATENT DOCUMENTS

| | | |
|---|---|---|
| CN | 102087446 A | 6/2011 |
| CN | 102253540 A | 11/2011 |
| CN | 102645798 A | 8/2012 |
| KR | 20080067041 A | 7/2008 |

OTHER PUBLICATIONS

First Chinese Office Action dated Mar. 3, 2014; Appln. No. 201210047059.7.
International Preliminary Report on Patentability Appln. No. PCT/CN2012/084407; Dated Sep. 2, 2014.

DISPLAY DEVICE AND MANUFACTURING METHOD THEREOF

FIELD OF THE INVENTION

Embodiments of the present invention relate to a display device and a manufacturing method thereof.

BACKGROUND

Transflective liquid crystal displays have both excellent reading performance of reflective displays in outdoor sunlight and good reading performance of transmissive displays with backlight illumination under no light or dim light circumstance, and are hence widely used in aircraft displays, in-vehicle displays, high-end mobile phones and portable computers.

A sub-pixel of a transflective liquid crystal display consists of a transmissive region and a reflective region. The transmissive region adopts the backlight source for luminescence and light can only transmit the liquid crystal layer once. While the reflective region illuminates by reflecting surrounding environment light source and light needs to transmit the liquid crystal layer twice, which makes the optical path difference of light passing reflective region twice that of transmissive region, disabling the transmissive region and the reflective region to obtain the same opto-electric characteristic at the same time, namely having unmatched opto-electric characteristic. To this end, prior art utilizes a double cell-thickness structure, that is, the transmissive region liquid crystal cell has a thickness two times larger than that of the reflective region, making the optical path difference of light passing the transmissive region and the optical path difference of light passing reflective region equal. However, different cell thickness will cause different response time of liquid crystal in transmissive region and reflective region, also increasing difficulty of manufacturing process and production costs. There is also a transflective display device structure with single cell thickness in prior art. Research thereof mostly focus on different liquid crystal modes for transmissive region and reflective region, increasing difficulty of manufacturing process and circuit driving and significantly increasing production costs.

SUMMARY

Embodiments of the present invention provide a display device including: an array substrate and a color filter substrate which are cell-assembled, the array substrate and the color filter substrate being formed with two-dimensionally arranged sub-pixel regions correspondingly; wall-shaped electrodes formed on the array substrate or the color filter substrate and interposed between the array substrate and the color filter substrate, the wall-shaped electrodes separating a row of or a column of the sub-pixel regions to divide each row or column of sub-pixel region into two rows or two columns of sub-subpixel regions that form transmissive regions and reflective regions respectively; and a liquid crystal layer interposed between the array substrate and the color filter substrate and comprising transmissive region liquid crystal and reflective region liquid crystal filled in the transmissive regions and the reflective regions, wherein light of the transmissive regions and the reflective regions has a same optical path difference.

Another embodiment of the present invention provides a manufacturing method of a display device including steps of: forming separately arranged wall-shaped electrodes on an array substrate or a color filter substrate and cell-assembling the array substrate and the color filter substrate to interpose the wall-shaped electrodes between the array substrate and the color filter substrate, the array substrate and the color filter substrate being formed with two-dimensionally arranged sub-pixel regions correspondingly, the wall-shaped electrodes separating a row of or a column of sub-pixel regions to divide each row or each column of pixels into two rows or two columns of sub-subpixel regions that form transmissive regions and reflective regions respectively; filling liquid crystal into the transmissive regions and the reflective regions respectively to make light of the transmissive regions and the reflective regions have a same optical path difference; and sealing the transmissive regions and the reflective regions and assembling with circuits to form the display device.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

First Embodiment

Figure 1:
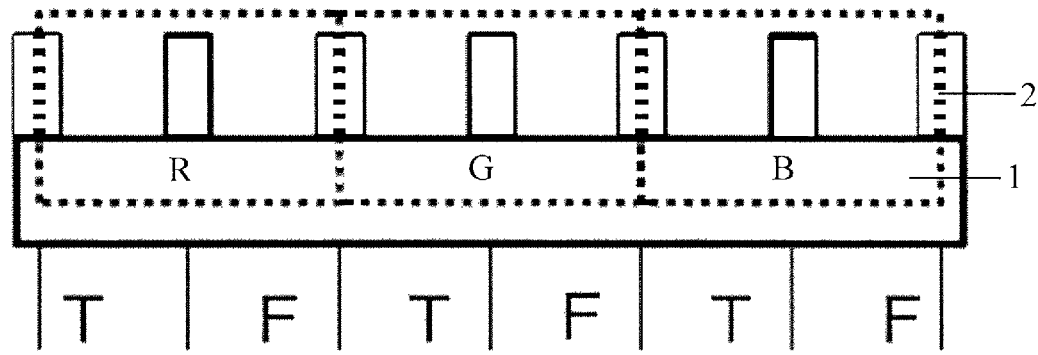
FIG. 1 is a structural representation of a liquid crystal cell in which wall-shaped electrodes are disposed on the array substrate in a first embodiment of the present invention.

The display device provided in the present embodiment includes a liquid crystal cell formed by cell-assembling an array substrate and a color filter substrate, and wall-shaped electrodes are separately disposed on the array substrate or the color filter substrate. The array substrate and the color filter substrate are formed with two-dimensionally arranged sub-pixel regions correspondingly. As illustrated in FIG. 1, the wall-shaped electrodes 2 separate a row of or a column of sub-pixel regions R or G or B and separate each row of or each column of sub-pixel region R or G or B into two rows of or two columns of sub-subpixel regions that form light transmissive regions T and light reflective regions F respectively, thereby forming a plurality of adjacent grooves corresponding to transmissive regions T and reflective regions F in the liquid crystal cell. The wall-shaped electrodes 2 are not only spacers of the transmissive regions T and the reflective regions F, but also provide strong transverse electric field as signal electrodes, and function to support the liquid crystal cell to keep cell thickness.

In one embodiment, the height of wall-shaped electrodes 2 in a direction perpendicular to the array substrate and the color filter substrate may be equal to the interval between the array substrate and the color filter substrate.

In the present embodiment, the thickness of liquid crystal cells corresponding to transmissive regions T and reflective regions F are the same (that is, liquid crystal in the transmissive regions T and reflective regions F have the same thickness), therefore grooves corresponding to transmissive regions T and reflective regions F are filled with liquid crystal with different parameters but allowing light in transmissive regions T and reflective regions F to have the same optical path difference respectively. Preferably, the difference of refractive index of liquid crystal in the transmissive regions may be chosen as twice as that in the reflective region, to allow the transmissive regions T and the reflective regions F have the same optical path difference and obtain good opto-electricity matching. For example, the transmissive region liquid crystal and the reflective region liquid crystal may be of blue phase mode.

In order to satisfy the requirements for transmissive and reflective display of the display device according to the present embodiment, transmissive regions T and reflective regions F in the liquid crystal cell are disposed alternately and area ratio between them may be adjusted accordingly depending on actual requirements.

Figure 2:
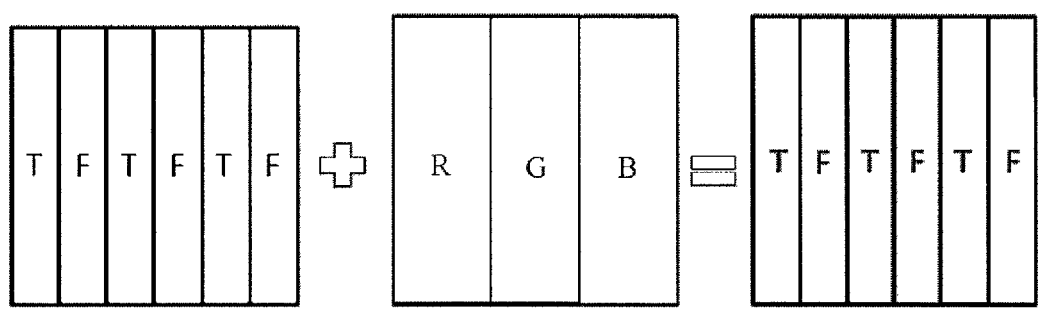
FIG. 2 is a schematic diagram of cell-assembling an array substrate and a color filter substrate before vacuum filling according to the first embodiment of the present invention.
Figure 3:
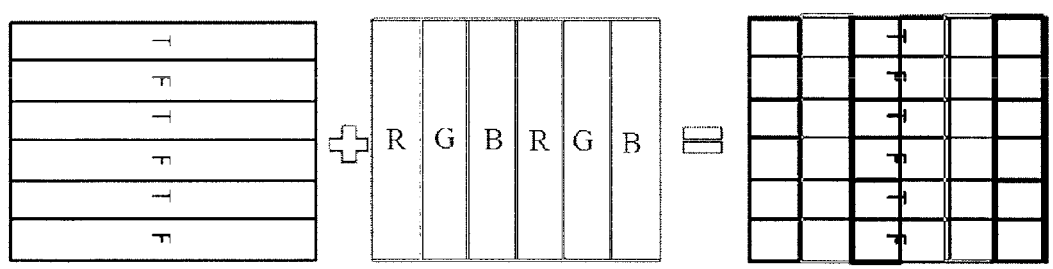
FIG. 3 is another schematic diagram of cell-assembling an array substrate and a color filter substrate before vacuum filling according to the first embodiment of the present invention.

FIG. 2 illustrates that the wall-shaped electrodes are arranged in the row direction to divide sub-pixel regions into sub-subpixel regions, and further illustrates a schematic diagram of cell-assembling of the array substrate and the color filter substrate; FIG. 3 illustrates that the wall-shaped electrodes are arranged in the column direction to divide sub-pixel regions on the color filter substrate into sub-subpixel regions, and further illustrates a schematic diagram of cell-assembling of the array substrate and the color filter substrate. Therefore, the wall-shaped electrodes may extend along row or column direction of sub-pixel regions, but not limited thereto.

Second Embodiment

The present embodiment provides a method for manufacturing the display device described in the first embodiment including the following process:

Firstly, wall-shaped electrodes are fabricated on an array substrate or a color filter substrate.

For example, photo lithography material is coated on the array substrate and is subjected to lithography via a mask to form wall-shaped electrodes disposed separately. The array substrate and the color filter substrate are formed with two-dimensionally arranged sub-pixel regions correspondingly. Wall-shaped electrodes separate a row of or a column of sub-pixel regions and divide each row or column of sub-pixel region into two rows of or two columns of sub-subpixel regions that form light transmissive regions and light reflective regions alternately disposed. In one embodiment, the wall-shaped electrodes may be formed such that the height along a direction perpendicular to the array substrate or the color filter substrate is equal to intervals between them after cell-assembling the array substrate and the color filter substrate.

Secondly, the array substrate and the color filter substrate are cell-assembled.

For example, sealant is coated on the color filter substrate, the array substrate and the color filter substrate are cell-assembled, cured and are cut into a screen;

Finally, liquid crystal is filled to form a display device.

For example, under a vacuum environment, transmissive region liquid crystal and reflective region liquid crystal are filled into transmissive regions and reflective regions in the cut screen respectively by means of capillary force. Transmissive region liquid crystal and reflective region liquid crystal have different parameters which can allow light in transmissive regions and reflective regions have the same optical path difference. Preferably, the difference of refractive index of liquid crystal in the transmissive regions is as twice as that in the reflective region, to allow the transmissive regions T and the reflective regions F have the same optical path difference and obtain good opto-electricity matching. For example, the transmissive region liquid crystal and the reflective region liquid crystal may be of blue phase mode. In addition, the transmissive regions and the reflective regions are sealed and assembled with circuits to form a display device.

Figure 4:
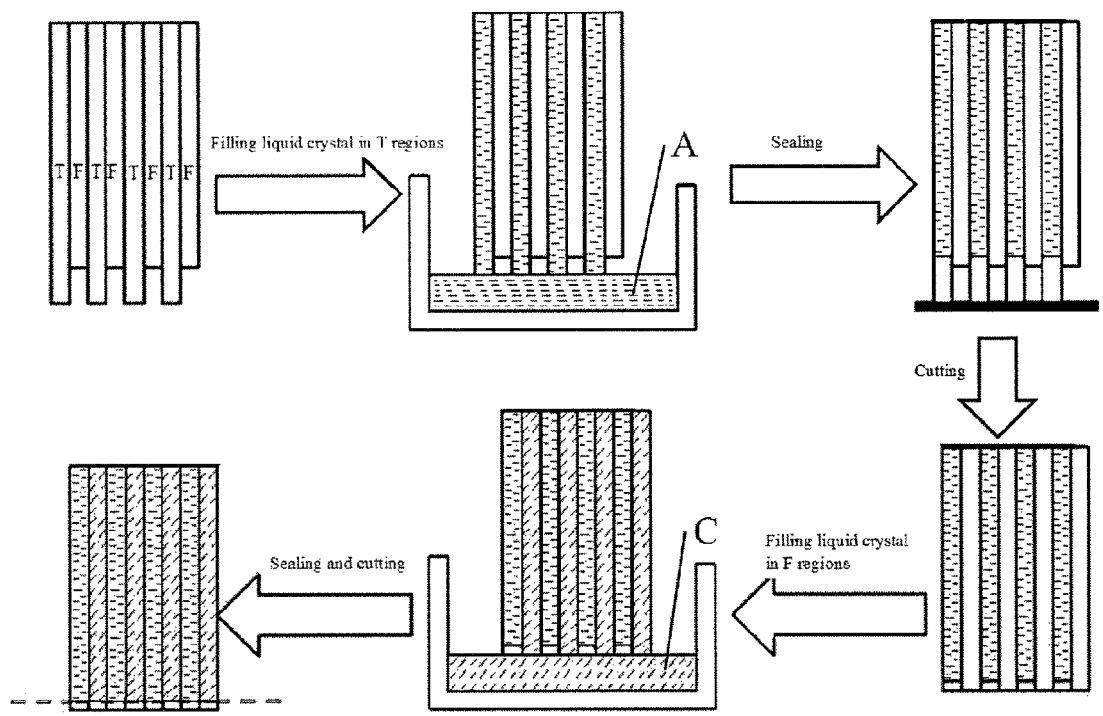
FIG. 4 is a schematic diagram of filling different liquid crystal into liquid crystal cells by vacuum capillary action according to the first embodiment of the present invention.

In the present embodiment, the filling technology for transmissive region and reflective region liquid crystal is quite artful. Firstly, when wall-shaped electrodes are manufactured, it is realized that in the grooves formed by adjacent wall-shaped electrodes and the array substrate, the lengths of grooves corresponding to transmissive regions and reflective regions are not equal. As illustrated in FIG. 4, the length of grooves corresponding to transmissive regions T is greater than that of reflective regions F. At this time, liquid crystal filling in the transmissive regions T is firstly performed by immerging grooves corresponding to transmissive regions T in the transmissive region liquid crystal A to suction liquid crystal into the grooves by means of capillary force. Then sealing glue is used to seal grooves corresponding to transmissive regions T and they are cut into a length equal to that of grooves corresponding to reflective regions F. Subsequently, liquid crystal is filled into the reflective regions F. Grooves corresponding to reflective regions F are immerged in reflective region liquid crystal C to suction liquid crystal into grooves by means of capillary force. Then sealing glue is used to seal grooves corresponding to reflective regions F and some glue is cut to complete filling of different liquid crystal in transmissive regions T and reflective regions F.

Obviously, it is also possible to make grooves corresponding to transmissive regions T have a length less than that of reflective regions F. Liquid crystal is firstly filled into reflective regions F according to the above-mentioned filling mode, and then liquid crystal is filled into transmissive regions T.

As can be seen in the above embodiments, embodiments of the present invention realize transmissive and reflective display of display devices that is not disturbed by ambient light, and high visibility and energy conservation by forming transmissive regions and reflective regions through disposing wall-shaped electrodes on the array substrate and filling liquid crystal with different parameters in the transmissive regions and reflective regions. The transmissive regions and reflective regions have consistent cell thickness, small response time influence and simple technology. Wall-shaped electrodes have high transverse electric field and significantly reduce driving voltage. Compensation film or in-cell retardation sheet is omitted to reduce costs. Transmissive regions and reflective regions are only different in liquid crystal which allows simple manufacturing process and circuit driving and high feasibility.

In addition, according to embodiments of the present invention, there is no particular limitation on other pixel structures of transmissive regions and reflective regions (such as pixel electrodes and common electrodes of transmissive regions and reflective regions, color filters, signal lines and thin film transistors, etc.), any suitable pixel structure may be used as desired.

According to embodiments of the present invention, at least the following structures and methods may be provided:

(1) A display device, comprising:
an array substrate and a color filter substrate which are cell-assembled, the array substrate and the color filter substrate being formed with two-dimensionally arranged sub-pixel regions correspondingly;
wall-shaped electrodes formed on the array substrate or the color filter substrate and interposed between the array substrate and the color filter substrate, the wall-shaped electrodes separating a row of or a column of the sub-pixel regions to divide each row or column of sub-pixel regions into two rows or two columns of sub-subpixel regions that form transmissive regions and reflective regions respectively; and
a liquid crystal layer interposed between the array substrate and the color filter substrate and comprising transmissive region liquid crystal and reflective region liquid crystal filled in the transmissive regions and the reflective regions,
wherein the transmissive region liquid crystal and the reflective region liquid crystal use different liquid crystal and light of the transmissive region and the reflective region have a same optical path difference.

(2) The display device according to (1), wherein the transmissive region liquid crystal and the reflective region liquid crystal have an identical thickness.

(3) The display device according to (1) or (2), wherein the transmissive region and the reflective region are disposed alternately.

(4) The display device according to any one of (1) to (3), wherein difference of refractive index of the liquid crystal in the transmissive regions is two times that of the reflective regions.

(5) The display device according to any one of (1) to (4), wherein a height of the wall-shaped electrodes in a direction perpendicular to the array substrate and the color filter substrate is equal to an interval between the array substrate and the color filter substrate.

(6) The display device according to any one of (1) to (5), wherein the wall-shaped electrodes extend along a row or column direction of the sub-pixel regions.

(7) A method for manufacturing a display device, comprising steps of:
forming separately arranged wall-shaped electrodes on an array substrate or a color filter substrate and cell-assembling the array substrate and the color filter substrate to interpose the wall-shaped electrodes between the array substrate and the color filter substrate, the array substrate and the color filter substrate being faulted with two-dimensionally arranged sub-pixel regions correspondingly, the wall-shaped electrodes separating a row of or a column of sub-pixel regions to divide each row or each column of pixels into two rows or two columns of sub-subpixel regions that form transmissive regions and reflective regions respectively;
filling liquid crystal into the transmissive regions and the reflective regions respectively to make light of the transmissive regions and the light of the reflective regions have a same optical path difference; and
sealing the transmissive regions and the reflective regions and assembling with circuits to form the display device.

(8) The method for manufacturing the display device according to (7), wherein adjacent wall-shaped electrodes form grooves together with the array substrate or the color filter substrate, and grooves corresponding to the transmissive regions and the reflective regions have unequal lengths.

(9) The method for manufacturing the display device according to (7) or (8), wherein the step of filling liquid crystal comprises:
in a vacuum environment, immerging grooves with larger length into liquid crystal to be filled to suction liquid crystal into the grooves by means of capillary force, and then sealing the grooves with larger length with sealing glue, and cutting the grooves with larger length to have a length equal to that of the grooves with smaller length; and
immerging the grooves with smaller length into liquid crystal to be filled to suction the liquid crystal into the grooves by means of capillary force, and then sealing the grooves with smaller length with sealing glue and cutting off some sealing glue.

(10) The method for manufacturing the display device according to any one of (7) to (9), wherein the liquid crystal in the transmissive regions and the reflective regions has equal thickness.

(11) The method for manufacturing the display device according to any one of (7) to (10), wherein the transmissive region and the reflective region are disposed alternately.

(12) The method for manufacturing the display device according to any one of (7) to (11), wherein a difference of refractive index of the liquid crystal in the transmissive regions is as two times larger as that in the reflective regions.

(13) The method for manufacturing the display device according to any one of (7) to (12), wherein a height of the wall-shaped electrodes in a direction perpendicular to the array substrate and the color filter substrate is equal to an interval between the array substrate and the color filter substrate.

(14) The method for manufacturing the display device according to any one of (7) to (13), wherein the wall-shaped electrodes are formed to extend along a row or column direction of the sub-pixel regions.

The foregoing is merely exemplary embodiments of the invention, but is not used to limit the protection scope of the invention. The protection scope of the invention shall be defined by the attached claims.

What is claimed is:

1. A display device, comprising:
an array substrate and a color filter substrate which are cell-assembled, the array substrate and the color filter substrate being formed with two-dimensionally arranged sub-pixel regions correspondingly;
wall-shaped electrodes formed on the array substrate or the color filter substrate and interposed between the array substrate and the color filter substrate, the wall-shaped electrodes separating a row of or a column of the sub-pixel regions to divide each row or column of sub-pixel regions into two rows or two columns of sub-subpixel regions that form transmissive regions and reflective regions respectively; and
a liquid crystal layer interposed between the array substrate and the color filter substrate and comprising transmissive region liquid crystal and reflective region liquid crystal filled in the transmissive regions and the reflective regions,
wherein the transmissive region liquid crystal and the reflective region liquid crystal use different liquid crystal and light of the transmissive region and the reflective region have a same optical path difference, wherein difference of refractive index of the liquid crystal in the transmissive regions is two times that of the reflective regions.

2. The display device of claim 1, wherein the transmissive region liquid crystal and the reflective region liquid crystal have an identical thickness.

3. The display device of claim 1, wherein the transmissive region and the reflective region are disposed alternately.

4. The display device of claim 1, wherein a height of the wall-shaped electrodes in a direction perpendicular to the array substrate and the color filter substrate is equal to an interval between the array substrate and the color filter substrate.

5. The display device of claim 1, wherein the wall-shaped electrodes extend along a row or column direction of the sub-pixel regions.

6. A method for manufacturing a display device, comprising steps of:

forming separately arranged wall-shaped electrodes on an array substrate or a color filter substrate and cell-assembling the array substrate and the color filter substrate to interpose the wall-shaped electrodes between the array substrate and the color filter substrate, the array substrate and the color filter substrate being formed with two-dimensionally arranged sub-pixel regions correspondingly, the wall-shaped electrodes separating a row of or a column of sub-pixel regions to divide each row or each column of pixels into two rows or two columns of sub-subpixel regions that form transmissive regions and reflective regions respectively;

filling liquid crystal into the transmissive regions and the reflective regions respectively so as to form transmissive region liquid crystal and reflective region liquid crystal, the transmissive region liquid crystal and the reflective region liquid crystal using different liquid crystal to make light of the transmissive regions and the light of the reflective regions have a same optical path difference; and sealing the transmissive regions and the reflective regions and assembling with circuits to form the display device, wherein a difference of refractive index of the liquid crystal in the transmissive regions is as two times larger as that in the reflective regions.

7. The method for manufacturing the display device of claim 6, wherein adjacent wall-shaped electrodes form grooves together with the array substrate or the color filter substrate, and grooves corresponding to the transmissive regions and the reflective regions have unequal lengths.

8. The method for manufacturing the display device of claim 7, wherein the step of filling liquid crystal comprises:

in a vacuum environment, immerging grooves with larger length into liquid crystal to be filled to suction liquid crystal into the grooves by means of capillary force, and then sealing the grooves with larger length with sealing glue, and cutting the grooves with larger length to have a length equal to that of the grooves with smaller length; and immerging the grooves with smaller length into liquid crystal to be filled to suction the liquid crystal into the grooves by means of capillary force, and then sealing the grooves with smaller length with sealing glue and cutting off some sealing glue.

9. The method for manufacturing the display device of claim 6, wherein the liquid crystal in the transmissive regions and the reflective regions has equal thickness.

10. The method for manufacturing the display device of claim 6, wherein the transmissive region and the reflective region are disposed alternately.

11. The method for manufacturing the display device of claim 6, wherein a height of the wall-shaped electrodes in a direction perpendicular to the array substrate and the color filter substrate is equal to an interval between the array substrate and the color filter substrate.

12. The method for manufacturing the display device of claim 6, wherein the wall-shaped electrodes are formed to extend along a row or column direction of the sub-pixel regions.

* * * * *